United States Patent [19]
Grabscheid

[11] Patent Number: 5,395,172
[45] Date of Patent: Mar. 7, 1995

[54] BEARING ASSEMBLY

[75] Inventor: Joachim Grabscheid, Heuchlingen, Germany

[73] Assignee: J.M. Voith GmbH, Heidenheim, Germany

[21] Appl. No.: 129,136

[22] Filed: Oct. 6, 1993

[30] Foreign Application Priority Data

Apr. 1, 1992 [DE] Germany .................. 42 10 685.0

[51] Int. Cl.⁶ ................. F16C 19/52; F16C 23/04
[52] U.S. Cl. ..................... 384/557; 384/558
[58] Field of Search ............ 384/192, 202, 256, 419, 384/493, 495, 557, 558, 905

[56] References Cited

U.S. PATENT DOCUMENTS

| | | | |
|---|---|---|---|
| 1,825,293 | 9/1931 | Van Derhoef | 384/557 |
| 2,430,487 | 11/1947 | Wessenger | 384/557 X |
| 2,474,489 | 6/1949 | Mortensen | 384/557 |
| 2,506,525 | 5/1950 | Thomas et al. | 384/558 |
| 3,427,081 | 2/1962 | Dellinger | 384/558 |
| 3,929,389 | 12/1975 | Riegler | 384/495 X |

FOREIGN PATENT DOCUMENTS

2328989 1/1974 Germany .
3040891 1/1986 Germany .

Primary Examiner—Thomas R. Hannon
Attorney, Agent, or Firm—Ostrolenk, Faber, Gerb & Soffen

[57] ABSTRACT

Bearing assembly (11) for mounting a bearing journal (2) of a rotatable roll (1). The bearing journal (2) is supported by a spherical bearing element (2a) in a bearing housing (5). The bearing journal (2) is fixed in the direction of the longitudinal axis (L) of the bearing assembly (11) in the bearing housing (5). The bearing housing (5) is connected with the aid of axial guide elements to a base (10), which is fastened on a framework (15) or foundation (or on a swivel lever). The axial guide elements are guide rods (12a, 12b) which are parallel to the longitudinal axis (L) and which engage in the bearing housing (5) and in the base (10). The one guide rod (12b) is displaceable transversely to its axis, so that the bearing housing (5) can expand transversely to the longitudinal axis (L) relative to the base (10).

25 Claims, 7 Drawing Sheets

BEARING ASSEMBLY

BACKGROUND OF THE INVENTION

The invention relates to a bearing assembly for mounting a bearing journal of rotatable roll, drum (for example drying cylinder) or the like, specifically having the features that permit longitudinal expansion or contraction of a mounted roll and in particular to the means permitting the bearing housing for the roll to shift longitudinally of the roll. The bearing assembly includes a bearing journal of a rotatable roll supported by a spherical bearing element and the spherical bearing element is held in a bearing housing. The bearing journal of the rotatable roll is fixed in the direction of the longitudinal axis of the bearing assembly within the bearing housing. The bearing housing is in turn supported to a base which is, in turn, supported on a foundation. The invention is concerned with adjustment in the position of the bearing housing with reference to the base. The invention relates both to bearing assemblies for a roll or drum of which the bearing journals are rotatable together with the roll body, and to bearing assemblies for a roll or pressing unit through which a stationary yoke with stationary bearing journals extends; this is, for example, a controlled deflection roll or an elongated nip pressing unit.

To be more precise: the invention relates to a bearing assembly in which the bearing journal is fixed in the axial direction in the bearing housing and in which the bearing housing is connected with the aid of axial guide elements to a base. The latter is fastened on a machine frame or foundation; under certain circumstances, it may also be fastened on a swivel lever. The axial guide elements allow the rotating roll body and/or the stationary yoke to expand in the longitudinal direction during operation, the bearing journal shifting together with the bearing housing in the longitudinal direction. This arrangement makes it possible that—in the case of a rotatable bearing journal—the rolling-contact bearing is fixed axially in the bearing housing, that is to say it is not displaceable axially in the latter. In the case of a stationary bearing journal, the latter is likewise fixed axially in the bearing housing. Thus, in both cases, it is possible to dispense with sliding surfaces, which on the one hand would have to be suitable for transferring great forces (for example pressing forces) and on the other hand would have to be suitable for the said axial displacement.

A preferred field of application of the invention is that of pressing apparatuses for a running web. Such a pressing apparatus may, for example, be part of a paper making machine and serve for dewatering or smoothing the paper web to be produced. Such an apparatus is preferably composed of a first rotatable pressing roll, the bearing journals of which are rotatable together with the roll body, and of a second pressing roll or a pressing unit, through which a stationary yoke with stationary bearing journals extends. In these cases, an internal loading device is provided on the stationary yoke. Concerned here are, for example, hydrostatic supporting elements, which transfer the pressing force from the stationary yoke onto the roll shell, or a shoe, which transfers the pressing force from the stationary yoke via a flexible pressing shell or via a flexible pressing band onto the first pressing roll. To be more precise: preferably concerned is a pressing apparatus with a closed system of forces; this means that the forces resulting from the pressing force are not introduced into a machine framework, foundation or the like, but are transferred with the aid of tension elements directly from the first pressing roll onto the second pressing roll or the said pressing unit. These tension elements preferably act directly on the mutually opposite bearing blocks; see, for example, Patent Application P 41 10 205.2.

U.S. Pat. No. 4,272,317 describes a pressing apparatus, in which a closed system of forces is likewise formed with the aid of tension bars. The upper pressing roll of this pressing apparatus is suspended with the aid of axial guide elements on a base. These axial guide elements thus need only to bear the dead weight of the complete pressing apparatus; they do not serve for transferring the pressing forces. Specifically, the following is provided there: at one roll end, the bearing housing is suspended by means of two links on a base, which for its part is fastened on the underside of a framework. At the other roll end, the bearing housing is suspended by means of a pivot on a similar base. A disadvantage of this design is that it can be used only if the roll (or the complete pressing apparatus) can be suspended on the underside of a framework; this is so since, in all other arrangements, for example in a standing arrangement, this design would be unstable.

So-called knife-edge bearings are also known. Here, the bearing housing rests on rolling-contact bodies which for their part are supported on the upper side of a base. A disadvantage of this design is that it is suitable exclusively for a standing arrangement. Moreover, the force transfer from the bearing housing to the base must only ever take place in the direction from top to bottom (not in the reverse direction), and the level of the transferable force is relatively low.

SUMMARY OF THE INVENTION

The present invention is therefore based on the object of designing a bearing assembly with axial guide elements in such a way that it is suitable for all conceivable installation situations and force directions, that is to say both for suspended arrangements and for standing arrangements; equally, it is intended to be possible that the bearing assembly is fastened on the side of a standing framework part.

Axial guide elements for the bearing housing connect the bearing housing with the base and those guide elements comprise sliding guides, such as are known from machine tools, for example for the purpose of displacing a work table on a machine base, are provided between the bearing housing and the base. Compared with the prior art mentioned at the beginning, the bearing housing (together with the bearing journal resting in it) is guided very reliably parallel to the longitudinal axis—when there is a longitudinal expansion of the roll, drum or the like—even when relatively high forces are transferred. By the particularly advantageous configuration of the sliding guide elements wherein the bearing housing and the base engage each other, this enables the bearing assembly to be used for any installation situations, that is to say both for standing arrangements and for suspended arrangements or for a lateral fastening on a framework.

On at least one of the two sliding guide elements, the bearing housing has no possibility of movement transversely to the longitudinal axis, that is to say it can shift exclusively parallel to the longitudinal axis.

The said sliding guide elements are preferably arranged on the circumference of the bearing housing on mutually opposite regions of the circumference of the bearing housing. If relatively great forces (for example the dead weight of a pressing apparatus comprising two pressing rolls) have to be transferred by means of the two sliding guide elements from the bearing housing onto the base, it is attempted to load the two sliding guide elements as uniformly as possible. In the simplest case, the two pressing rolls lie perpendicularly one above the other. The longitudinal axis of the bearing assembly and the axes of the sliding guide elements are arranged, as seen in the axial direction, in the corners of an obtuse angled triangle. However, it may also happen that the dead weight of a roll or of a drying cylinder is transferred by only one of the two sliding guide elements from the bearing housing onto the base, for example if the base has to be fastened on the side of a framework. In this case, it may be expedient to make the cross section of the force-transferring sliding guide element greater than the cross section of the other sliding guide element, which in this case serves predominantly only for guidance.

If the bearing housing and the base are heated or cooled unequally during operation, the risk may occur that the sliding guide elements tend to jam. In this case, an easy axial displaceability of the bearing housing relative to the base is no longer reliably ensured. Therefore, an additional object of the invention is to take measures by which an easy axial displaceability is ensured even in the case of change in temperature of bearing housing and base.

When at least one of the two sliding guide elements is displaceable transversely to the longitudinal axis, this makes it possible that the bearing housing can expand—for example in the case of a temperature increase—independently of the base transversely to the longitudinal axis of the bearing assembly (for example longitudinal axis of the roll.), without there being the risk of jamming in the sliding guide elements. The said thermal expansion of the bearing housing can take place, in particular, in the direction of the so-called guide plane, which is determined by the axes of the two sliding guide elements. It is essential that, for at least one of the two sliding guide elements, a so-called "transverse displaceability"—relative to the base or relative to the bearing housing—is provided.

There are several design possibilities for realizing the transverse displaceability of the one sliding guide element or of both sliding guide elements. Preferred is an embodiment in which the sliding guide element concerned has two mutually parallel guiding surfaces, which bear against corresponding sliding surfaces of the bearing housing or of the base. In other words, two mutually parallel pairs of sliding surfaces are formed.

Another possibility is that at least one of the sliding guide elements rests in a flexible arm which is a part either of the bearing housing or of the base.

Preferably, the transverse displaceability is provided only for one of the two sliding guide elements. This means that the position of the longitudinal axis of the other sliding guide element remains unchanged both in the base and in the bearing housing. This type of design has the consequence that the longitudinal axis of the bearing assembly, and consequently the longitudinal axis of the roll mounted therein, takes part in a transverse displacement of the movable sliding guide element. However, the size of the transverse displacement of the longitudinal axis of the roll is only approximately half the transverse displacement of the sliding guide element. Since, moreover, these temperature-dependent transverse displacements are generally very much smaller than 1 mm, in many applications they can be tolerated. For example, in paper making machines, in which the invention is mainly applicable, preferably in roll presses for dewatering or for smoothing the paper web, until now care has been taken to avoid giving the bearings for a roll the possibility of a transverse displacement. The invention is thus based, inter alia, on the realization that, in many applications, such a transverse displacement is quite permissible.

In the case of other embodiments of the invention, the said transverse displaceability is provided for both sliding guide elements. This may be advantageous, for example, whenever the degree of the transverse displaceability of an individual sliding guide element is not adequate, that is to say if a particularly great thermal expansion, for example of the bearing housing, is to be expected. The transverse displaceability of the two sliding guide elements is necessary in particular whenever a transverse displacement of the longitudinal axis of the bearing assembly (and consequently of the longitudinal axis of the roll) is to be avoided. In this case, it is necessary to provide between the two sliding guide elements an additional guide element with pairs of sliding surfaces arranged substantially perpendicular to the rod plane—and at a small distance from one another. This additional guide element ensures that the thermal expansion of the bearing housing (or of the base) takes place uniformly, half to one side and half to the other side. As a result, the position of the longitudinal axis of the bearing assembly remains unchanged.

Illustrative embodiments of the invention are described below with reference to the drawing.

BRIEF DESCRIPTION OF THE DRAWINGS

FIGS. 17A and 18B are sections according to line A of FIG. 17 and according to line B of FIG. 18, respectively, whereas FIGS. 17 and 18 are sections according to line C of FIG. 17A and according to line D of FIG. 18B, respectively.

DESCRIPTION OF THE PREFERRED EMBODIMENTS

Figure 1:
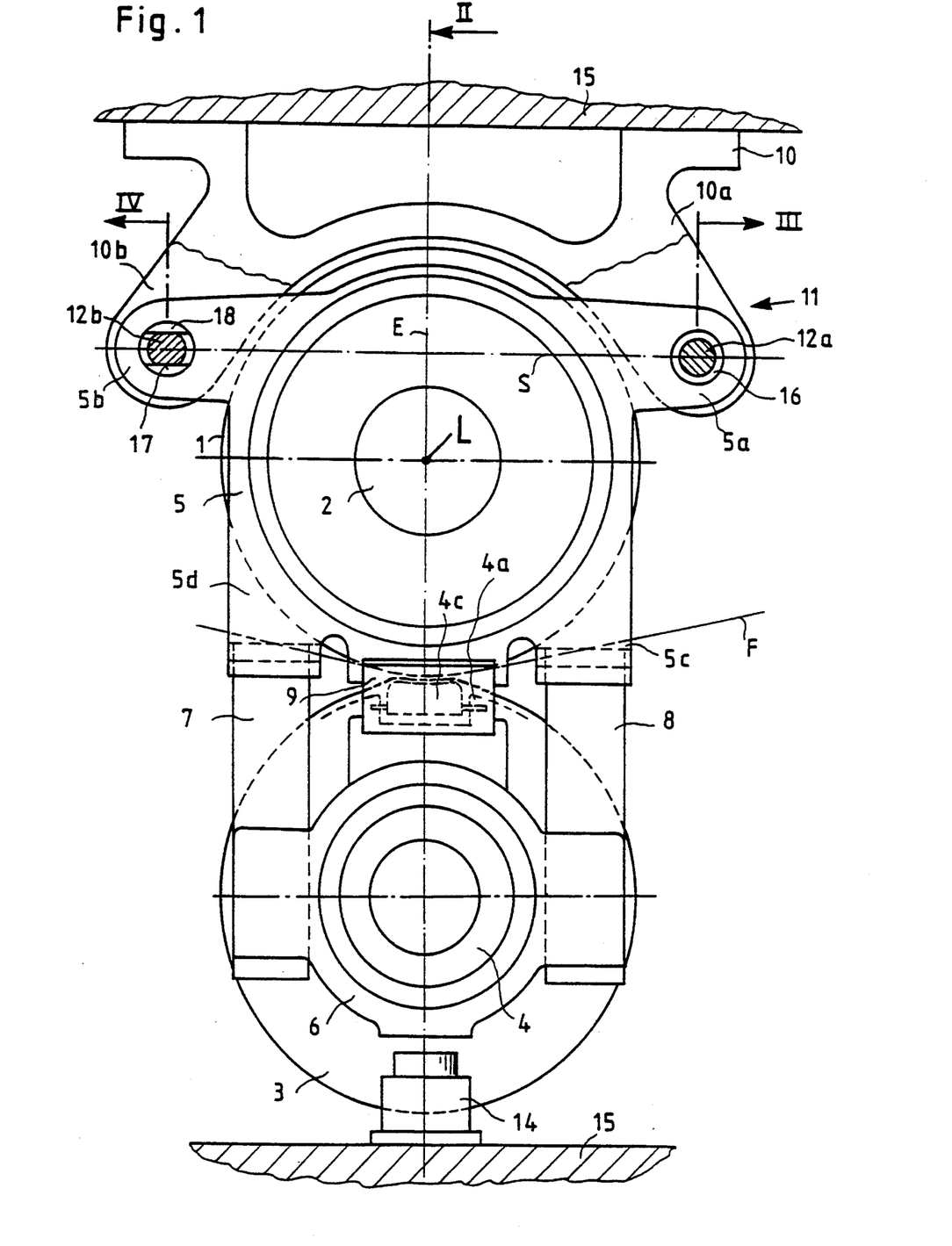
FIG. 1 is a side view of a roll press in the direction of the arrow I of FIG. 2.
Figure 2:
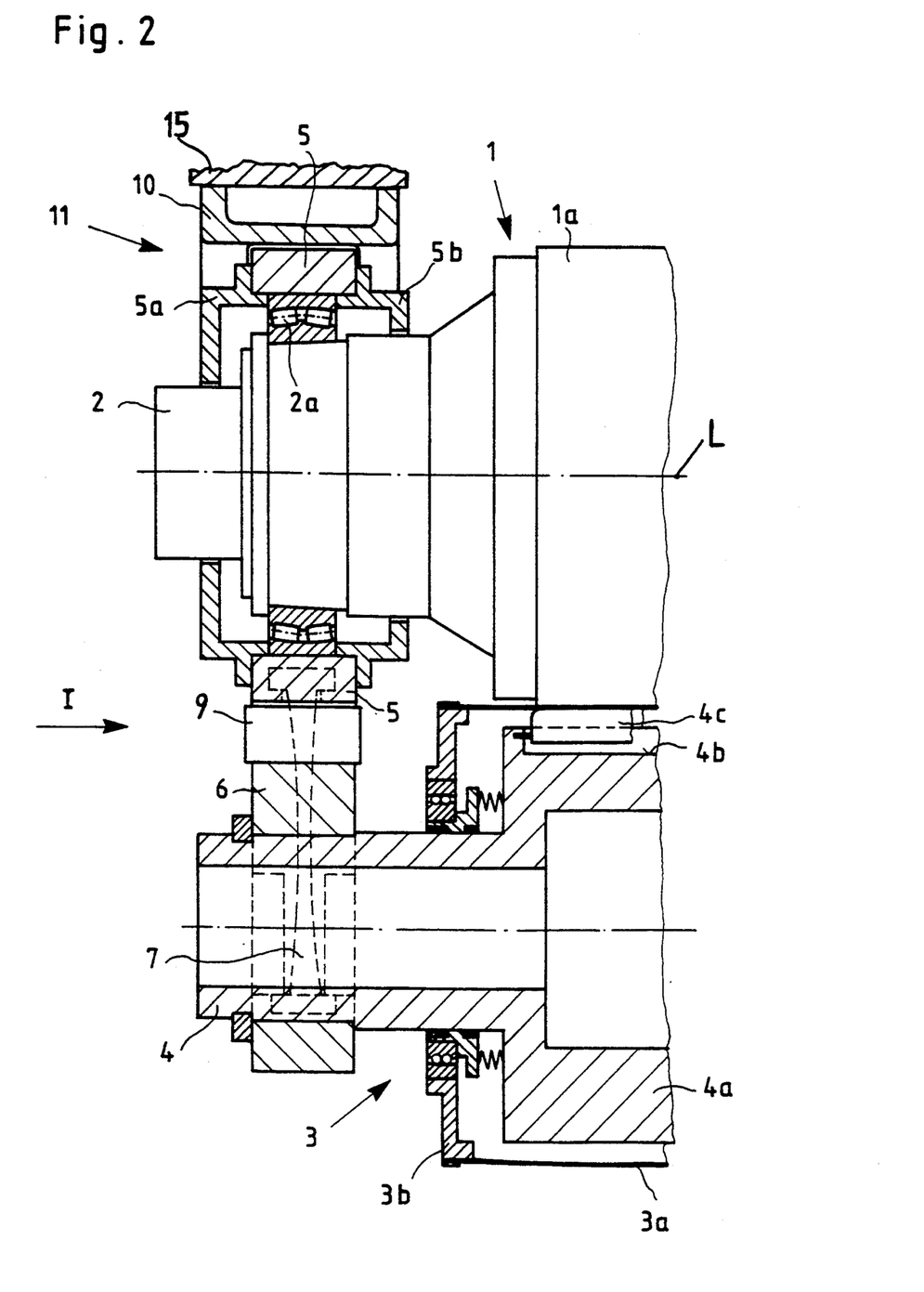
FIG. 2 is a longitudinal section along the line II of FIG. 1.

The roll press shown in FIGS. 1 and 2 comprises numerous already known elements, namely a normal pressing roll 1 and an elongated nip pressing roll 3. In the case of the example shown, the normal pressing roll 1 lies above the elongated nip pressing roll 3; however, the reverse arrangement is also possible. The principal axes of the pressing rolls 1 and 3 lie in a pressing plane E, which in the case of the illustrative embodiment shown runs vertically. The pressing roll 1 has a metallic roll shell 1a, which is rotatable about the longitudinal axis L, and a bearing journal 2, which is fastened on said shell and rests by means of a self-aligning roller bearing 2a in a bearing housing 5 (with covers 5a and 5b). The bearing housing 5 forms with a base 10 (and with additional elements described further below) a bearing assembly, which is denoted overall by 11 and is fixed in a suspended manner on the underside of an upper-lying part of an (only partially visible) frame-shaped machine framework 15. The rolling-contact bearing 2a is not axially displaceable in the bearing housing 5; this is so since it is clamped between the covers 5a and 5b.

The lower-lying elongated nip pressing roll 3 has a rotatable roll shell 3a, which is designed as a tube-shaped, flexible pressing shell and is fastened at both ends on a rotatable shell supporting disk 3b each. The latter rests on the stationary bearing journal 4 of a stationary supporting body 4a, which extends through the interior of the roll shell 3a. The supporting body 4a has opposite the normal pressing roll 1 a clearance 4b and in it a piston-like and hydraulically operable pressing shoe 4c. With its concave sliding surface, this pressing shoe presses the pressing shell 3a against the pressing roll 1, in order to form as a result a pressing nip which is elongated (in the running direction). Through this, a paper web to be dewatered runs together with at least one endless felt band F.

The stationary bearing journal 4 of the supporting body 4a rests in a bearing block 6. The latter is suspended with the aid of two (for example I-shaped) tension bars 7 and 8 on the bearing housing 5 of the (upper) pressing roll 1. These tension bars transfer the reaction force, resulting from the pressing force, directly from the bearing block 6 to the bearing housing 5, so that the machine framework 15 has to bear only the dead weight of the two pressing rolls 1 and 3. The (for example flexible) tension bars 7 and 8 allow that the bearing journal 4 and the bearing block 6 shift together a little in the longitudinal direction relative to the bearing housing 5 and/or incline out of the horizontal direction. An intermediate piece 9 serves predominantly for guiding the bearing block 6 in the pressing plane E. The tension bars 7 and 8 and the intermediate piece 9 can be removed (after raising the bearing block 6 by means of a lifting device 14), in order to permit a change of the felt band F and/or of the roll shell 3a.

In order that the bearing housing 5 of the press roll 1 is displaceable relative to the machine framework 15 in the direction of the longitudinal axis L of the roll (in order to permit a longitudinal expansion of the roll body 1a, 2), the following is provided: the bearing housing 5 has on both sides of the pressing plane E in each case an arm 5a and 5b. Each of these arms extends between two arms 10a and 10b, arranged in pairs, of the base 10. Parallel to the longitudinal axis L of the roll there extend two sliding guide elements, which are designed as guide rods 12a and 12b. The one (preferably cylindrical) guide rod 12a rests in bores of the arms 5a and 10a, the other rod 12b rests in bores of the arms 5b and 10b. The axes of the guide rods lie in a so-called guide plane S, which in the case of the illustrative embodiment shown lies horizontally. As a result, the two guide rods are each uniformly loaded transversely to their longitudinal axis by half the dead weight of the complete roll press.

Figure 3:
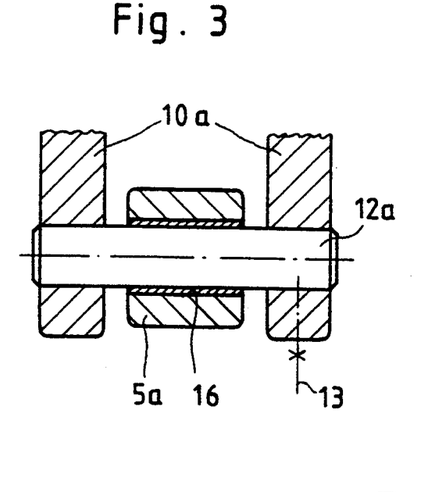
FIGS. 3 and 4 are partial sections along the lines III and IV, respectively, of FIG. 1.
Figure 4:
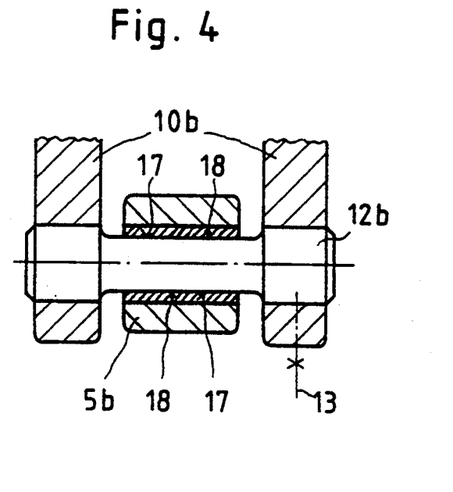

FIGS. 3 and 4 reveal that on both sides of each arm 5a and 5b of the bearing housing 5 a few millimeters distance are provided with respect to the neighboring arms 10a and 10b, respectively, so that bearing housing 5 and base 10 can move relative to each other in the axial direction. FIG. 1 reveals that the two guide rods 12a and 12b and the longitudinal axis L of the pressing roll 1 form with each other an obtuse-angled triangle, the longitudinal axis L of the pressing roll being arranged in the obtuse-angled corner of the triangle. Preferably, as shown in FIG. 1, the distance from the guide rod 12a to the longitudinal axis L is equal to the distance of the guide rod 12b from the longitudinal axis L and, accordingly, the guide rods 12a and 12b form an isosceles triangle with the longitudinal axis L. Alternatively to this, the longitudinal axis L of the pressing roll may lie in the guide plane S.

The two guide rods 12a and 12b are fixed, for example, in one of the base arms 10a, 10b each, for example by means of an (only symbolically shown) adjusting screw 13. The guide rod 12a has a constant diameter over its entire length. To reduce sliding friction, a sliding sleeve 16 may be provided in the arm 5a. The inner surface of the sliding sleeve 16 and the surface of the rod 12a form a pair of surfaces with a very low coefficient of friction.

All these measures allow, as already mentioned, a longitudinal expansion of the roll body 2, 2a. The latter can, moreover, deflect under the pressing force; therefore, self-setting self-aligning roller bearings 2a are provided.

In order that the bearing housing 5 can expand, for example under the effect of heat, laterally (that is to say transversely to the pressing plane E), the following is provided: the guide rod 12b has in the region of the arm 5b two mutually parallel guiding surfaces 17, which bear against corresponding sliding surfaces of the arm 5b. These guiding surfaces 17 lie, seen in FIG. 1, approximately parallel to the said guide plane S, which is determined by the axes of the guide rods 12a and 12b. Moreover, the diameter of the guide rod 12b is reduced in the region of the arm 5b, at least by the amount of the expected thermal expansion of the bearing housing. The said sliding surfaces of the arm 5b can preferably be formed by cylinder sections 18, which are fitted into the bore of the arm 5b. In the region of the arms 10b, the guide rod 12b has the normal circular cross section, the diameter of which corresponds to the common diameter of the cylinder sections 18. The guiding surfaces 17 and the sliding surfaces of the cylinder sections 18 are designed in such a way that they have a low coefficient of friction. In addition, a sliding sleeve may be provided in the arm 5b (around the cylinder sections 18). The design described makes it possible that the arm 5b of the bearing housing 5 can shift slightly (together with the cylinder sections 18) laterally relative to the guide rod 12b and to the base 10. The cylinder sections 18 can consequently be regarded as a component part of the arm 5b. Alternatively to the type of design shown, a rectangular clearance could be provided in the arm 5b instead of the bore. A further alternative would be to provide a rod of constantly rectangular cross section instead of the guide rod 12b shown.

Figure 5:
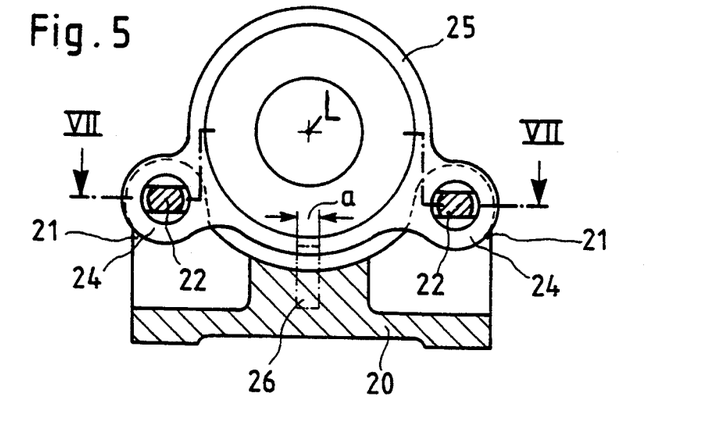
FIGS. 5 and 6 are diagrammatic side views of two different bearing assemblies, which both differ from FIG. 1.
Figure 6:
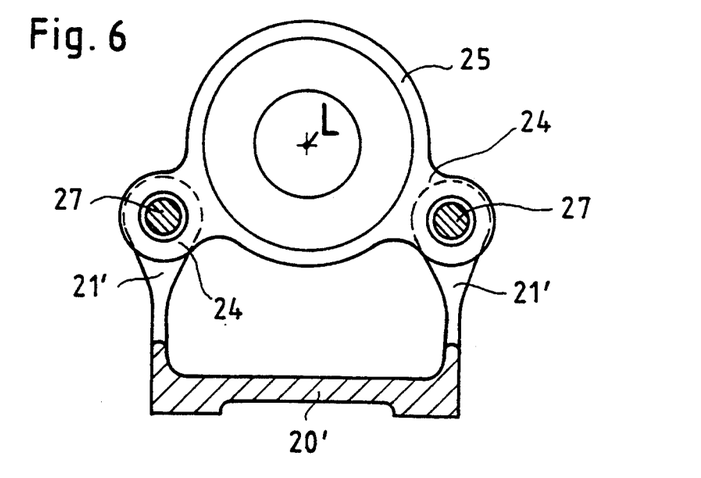

The arrangement shown in FIG. 1 could readily be turned through 180°, so that it stands with the aid of the base 10 on the lower region of the machine framework 15. Such bearing assemblies are shown in FIGS. 5 and 6. There again, a bearing housing 25 with two arms 24 arranged on both sides can be seen. In both FIGS. 5 and 6, the base 20 or 20' has in turn two pairs of arms 21 and 21', respectively. In FIG. 5, two identical guide rods 22 are provided, which both have a pair of guiding surfaces 17 (corresponding to the guide rod 12b of FIGS. 1 and 4). If necessary, in the middle between the two guide rods there may be provided an additional guide element 26, which in turn has two mutually parallel guiding surfaces which are arranged at a small distance a from each other and symmetrically with respect to the longitudinal axis L of the bearing assembly. The guide element 26 engages both in the bearing housing 25 and in the base 20.

In FIG. 6, both guide rods 27 are of a cylindrical design over their entire length and, moreover, are designed to correspond to the guide rod 12a of FIGS. 1 and 3. A transverse expansion of the bearing housing in the direction of the guide plane S is made possible by the arms 21' of the base 20' having—seen in a side view according to FIG. 6—a relatively small thickness and consequently being of a flexible design.

Figure 7:
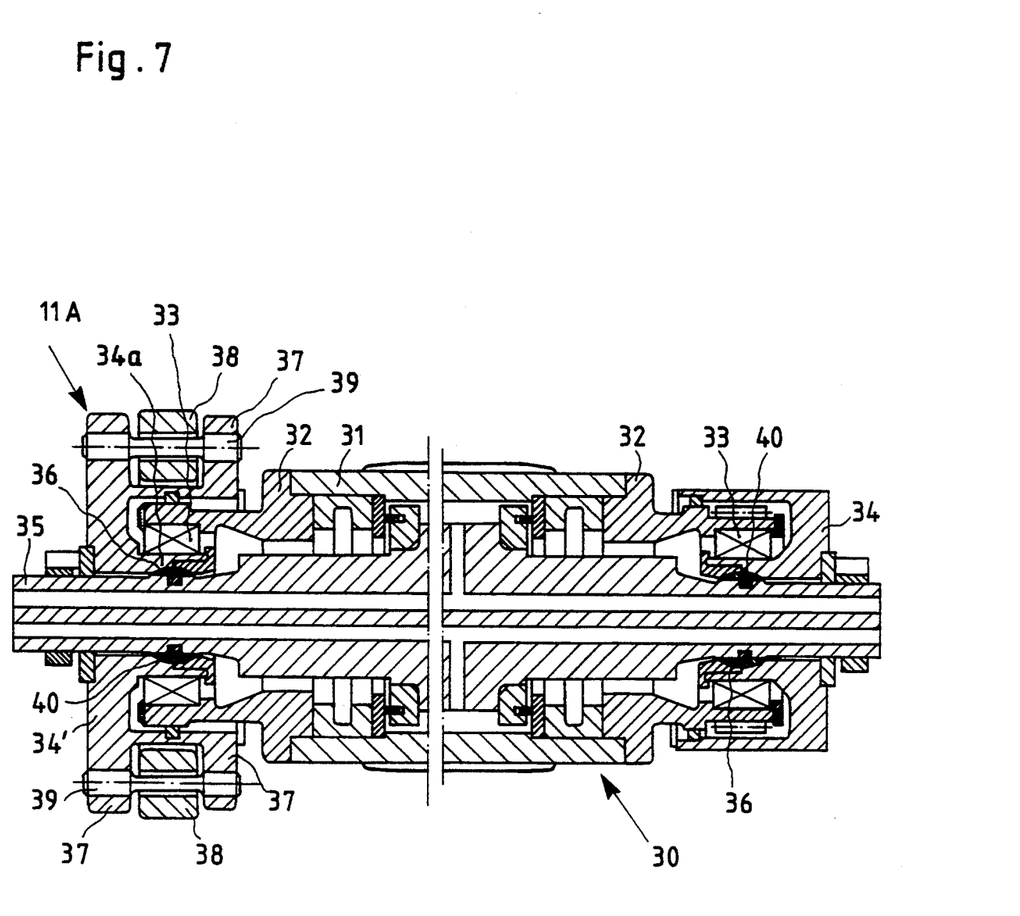
FIG. 7 is a partial section through a further illustrative embodiment, with a section profile which corresponds approximately to the line VII—VII of FIG. 5.

FIG. 7 shows a controlled deflection roll 30, which has at its one roll end a bearing assembly 11A according to the invention. The main elements of the roll 30 are a metallic roll shell 31, which is mounted at both roll ends by means of a bearing neck 32 and a self-aligning roller bearing 33 on the outside of a tubular cantilever arm 34a of a bearing housing 34, 34'. A stationary yoke 35 is likewise mounted at both roll ends by means of a spherical bush 36 in the interior of the tubular cantilever arm 34a, to be precise axially non-displaceable. The latter is because the bush 36 is fixed axially by means of a ring 40. The spherical bushes 36 allow a deflection of the yoke 35. For the left-hand roll end (in the drawing), the following applies: underneath the bearing neck 32 (seen in FIG. 7), the bearing housing 34' embraces the bearing neck. The bearing housing 34' has there, on either side of the bearing neck 32, a pair of arms 37. In between there extends on each side an arm 38 of a base, otherwise not visible. Bearing housing and base are in turn connected to each other by two guide rods 39, which are transversely displaceable in the arms 38 of the base, corresponding to the above explanations relating to FIGS. 1 to 6. This design allows a longitudinal expansion of the yoke 35.

Figures 8, 9:
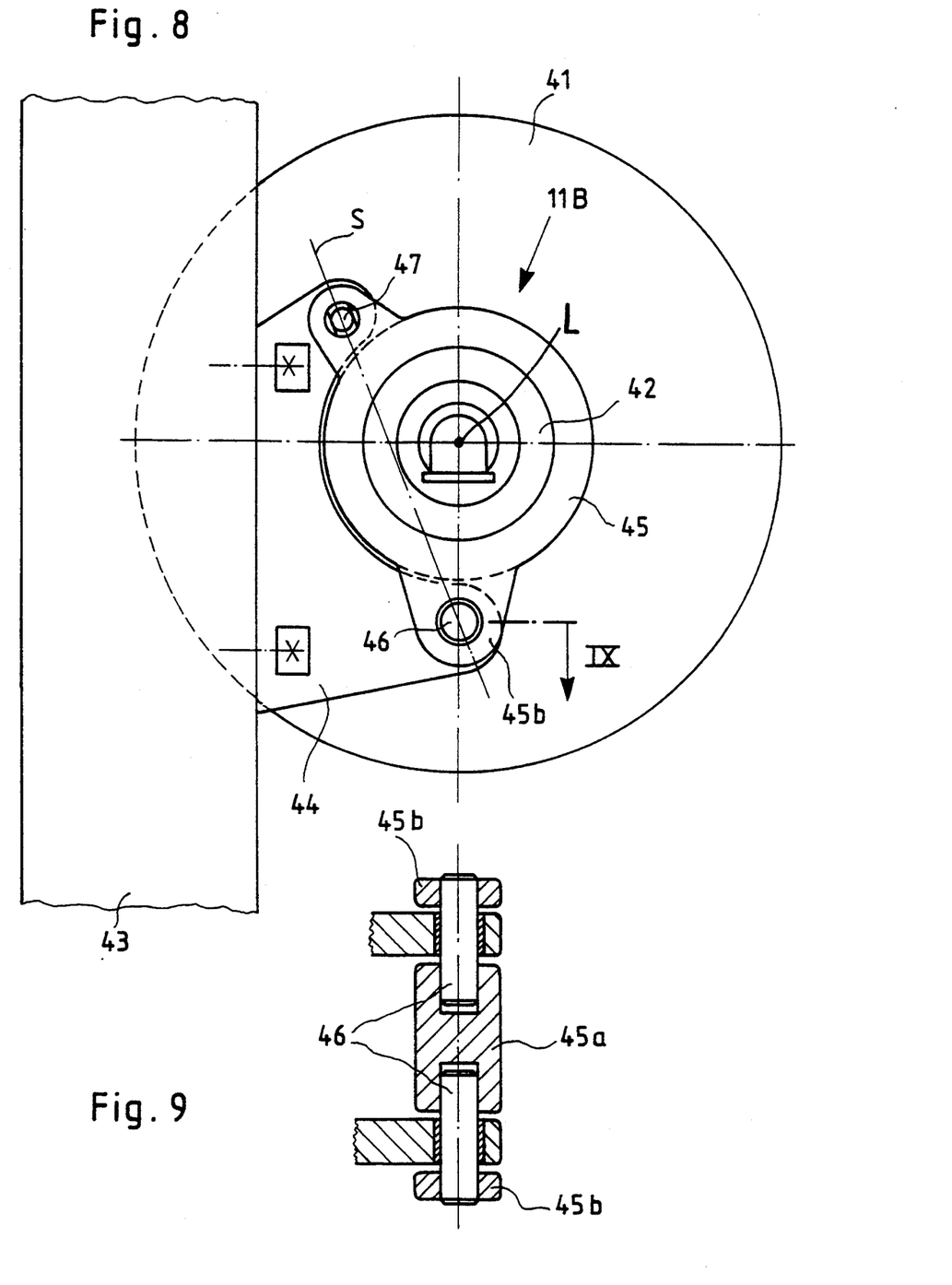
FIG. 8 shows a bearing assembly (provided for example for a dry cylinder) for fitting laterally onto a vertical framework.
FIG. 9 is a partial section along the line IX of FIG. 8.

The bearing assembly 11B shown in FIGS. 8 and 9 serves for mounting a drying cylinder 41 which is rotatable, can be heated by means of steam and has, in a known way, a rotatable bearing journal 42. The bearing assembly 11B is in turn composed of a bearing housing 45, a base 44 and two guide rods 46 and 47. The bearing journal 42 is mounted rotatably by means of a rolling-contact bearing (not visible) in the bearing housing 45. The bearing housing is fixed in the axial direction on the bearing journal 42. The base 44 is screwed on a, for example vertical, side surface of a framework 43.

As a departure from FIG. 1, the bearing housing 45 shown in FIGS. 8 and 9 has in the region of each guide bar not only a single arm, but altogether three arms, namely a middle arm 45a and two outer arms 45b. The base 44 has in turn in the region of each guide rod two arms 44a, which extend between the arms 45a and 45b of the bearing housing. As a departure from FIG. 1, each guide rod 46 and 47 is subdivided into two mutually coaxial rod halves, as shown in FIG. 9 by the example of the rod 46. The consequently two-part guide rod 46 is arranged vertically underneath the axis of rotation L of the drying cylinder 41. The two guide rod halves 46 have a constant diameter over their entire length; their axis is consequently fixed both in the base 44 and in the bearing housing 45. The diameter of this two-part guide rod 46 is greater than the diameter of the (likewise two-part) guide rod 47. The latter has, corresponding to FIGS. 1 and 4, mutually parallel guiding surfaces and consequently allows a thermal expansion of the bearing housing 45, in the direction of the guide plane S. In FIG. 8, the lower two-part guide rod 46 serves virtually exclusively for transferring the force of the weight of the drying cylinder 41. The illustrative embodiment shown in FIG. 8 shows that base 44 and bearing housing 45 and also the guide rods 46 and 47 do not necessarily have to lie symmetrical to the force direction. However, such a symmetrical arrangement is advantageous, in particular whenever the bearing assembly according to the invention has to transfer the force of the weight of a complete pressing apparatus (for example according to FIGS. 1 and 2) and whenever its pressing plane E is arranged vertically.

Figure 10:
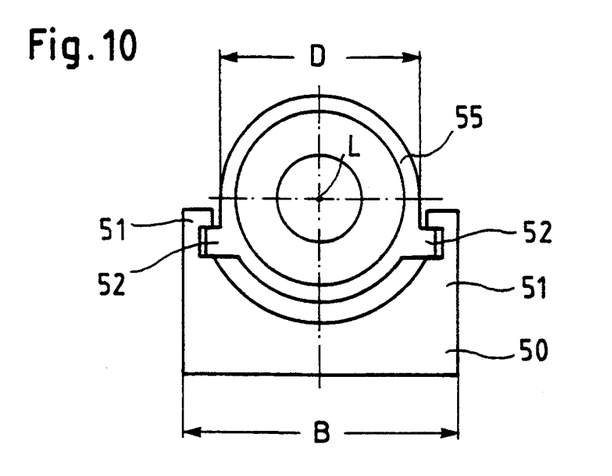
FIG. 10 shows a further bearing assembly differing from FIG. 1, in a diagrammatic side view.

The illustrative embodiments described so far have rod-shaped sliding guide elements, of which each represents a separate component, that is to say is produced independently of the bearing housing and of the base. As a departure from this, FIG. 10 shows a bearing assembly of which the sliding guide elements are designed as prismatic strips 52. These strips 52 are formed onto the bearing housing 55 and engage in corresponding clearances of the base 50. As, for example, in FIGS. 1, 5 and 6, the sliding guide elements 52 are arranged at mutually opposite regions of the circumference of the bearing housing 55 and in turn extend parallel to the longitudinal axis L of the bearing assembly, that is to say perpendicularly to the plane of the drawing. Similarly to in FIG. 5, both sliding guide elements 52 rest with lateral backlash in the clearances of the base 50. Thus, if necessary, in FIG. 10 an additional guide element is provided, corresponding to the additional guide element 26 of FIG. 5.

The base 50 embraces the part of the bearing housing 55 onto which the strips 52 are formed, by two arms 51. At the end of each arm 51, one of the said clearances is provided, so that the end of each arm has a claw-like (or claw-similar) shape.

Figure 11:
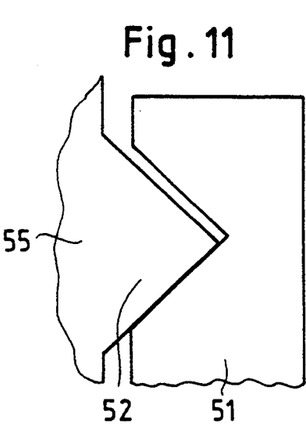
FIGS. 11 to 18 show different types of design of prismatic axial guide elements.
Figure 12:
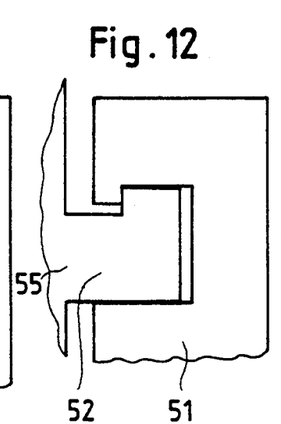
Figure 13:
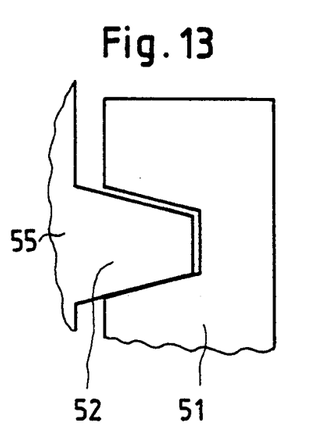
Figure 14:
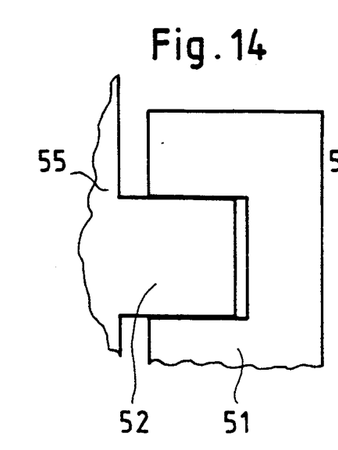
Figure 15:
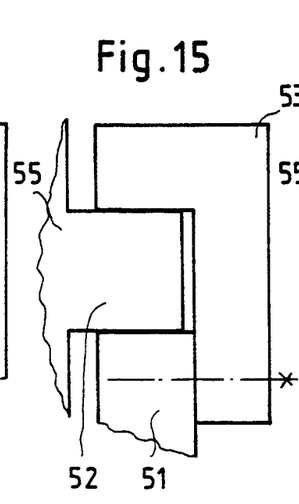

The cross-sectional shape of the prismatic strips 52 may vary quite considerably, as FIGS. 11–14 show. FIG. 11 shows a triangular cross-sectional shape, FIG. 12 shows an L-shaped cross-sectional shape, FIG. 13 shows a trapezoidal cross-sectional shape and FIG. 14 (similarly to FIG. 10) shows a rectangular cross-sectional shape. In order to facilitate the installation of the bearing assembly, the claw-shaped end of at least one of the two arms 51 may—according to FIG. 15 or 16—be designed such that it can be dismantled. In other words: a claw part 53 or 54 is fastened by means of screws on the main part of the base 50, 51. According to FIG. 15, the removable claw part 53 has an L-shaped cross section; by contrast, in FIG. 16 a removable claw part 54 of rectangular cross section is provided.

In FIG. 10, the outside diameter of the bearing housing 55 is denoted by D and the width of the base 50 is denoted by B. Thanks to the prismatic sliding guide elements 52 formed onto the bearing housing 55, the width B is only slightly greater than the outside diameter D of the bearing housing. This type of design is thus relatively compact and space-saving, compared with the embodiments with rod-shaped sliding guide elements, for example according to FIGS. 1 and 5.

Figure 16:
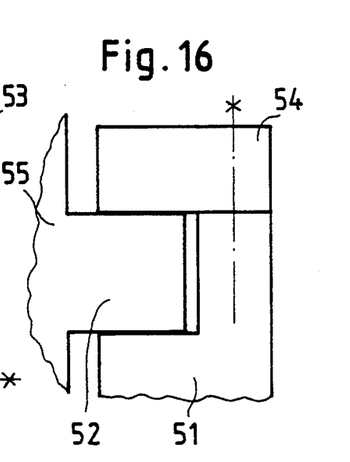
Figure 17:
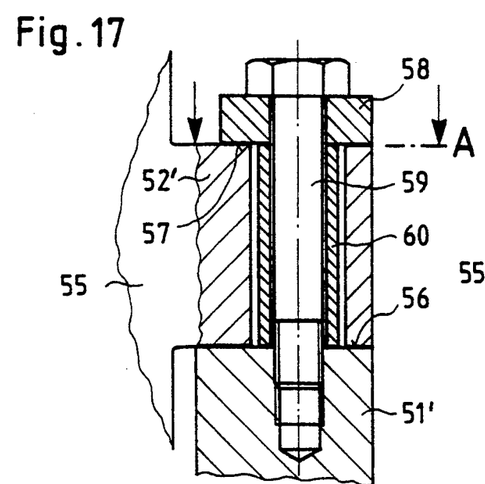
Figure 18:
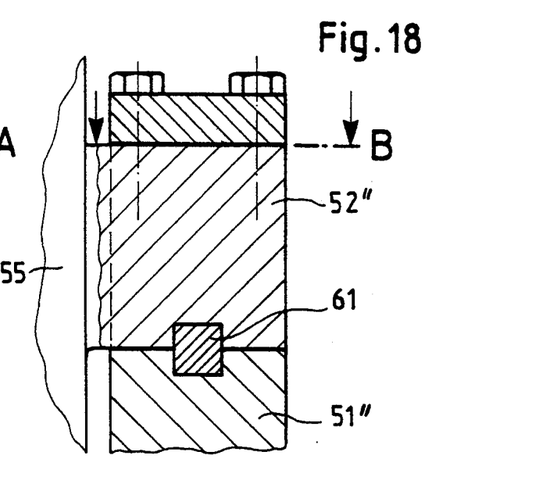

A comparison of FIGS. 16 and 17 shows that the width B of the base 50 can be reduced even further relative to the outside dimension D of the bearing housing 55. For this purpose, for guiding one of the prismatic strips 52' of the bearing housing 55 the following is provided: the end of the base arm 51' has a first sliding surface 56, on which the bearing housing 55 rests by the strip 52'. A second sliding surface 57 is provided on an auxiliary strip 58. The latter is held by means of a screw 59 and a spacer sleeve 60 at a certain distance from the first sliding surface 56. This distance is slightly greater than the thickness of the strip 52', so that jamming is avoided. According to FIGS. 17 and 17a, the screw 59 and the spacer sleeve 60 penetrate the prismatic strip 52'. In this case, there is a lateral backlash between the spacer sleeve 60 and the strip 52', so that in turn a transverse expansion of the bearing housing 55 is possible. A design which is different from this is shown in FIGS. 18 and 18B. Here, a feather key 61, which extends parallel to the longitudinal axis L of the bearing assembly, is inserted between the end of the base arm 51'' and the prismatic strip 52'' of the bearing housing 55. The feather key 61 consequently allows a displacing of the bearing housing 55 parallel to the longitudinal axis L of the roll mounted therein, but no transverse displacement of the bearing housing.

Figure 19:
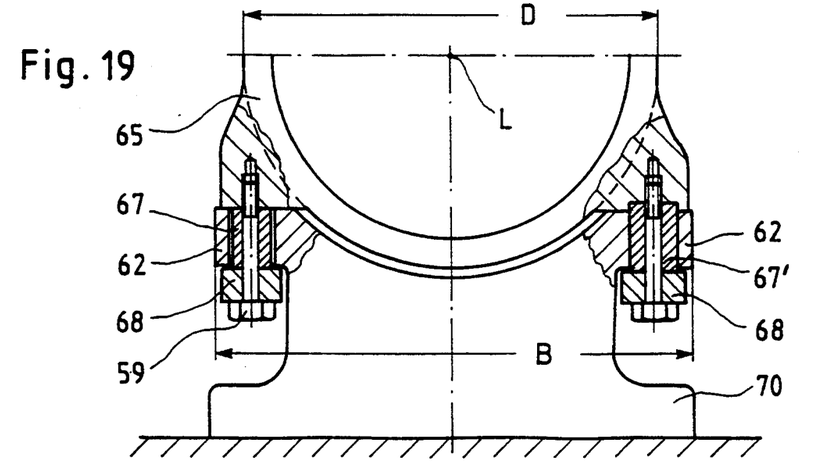
FIG. 19 shows a further development of the example according to FIG. 10.

FIG. 19 shows a further possible modification of the illustrative embodiments described above. Two prismatic strips 62 (having substantially a rectangular cross section) are formed not onto the bearing housing 65, but on to the base 70. These strips 62 engage (generally speaking) into clearances of the bearing housing 65. Specifically, a type of design corresponding to FIG. 17 with an auxiliary strip 68 and with a spacer sleeve 67 and 67' is provided. The one spacer sleeve 67' has no lateral backlash relative to the base 70; it therefore serves for laterally guiding the bearing housing 65. In contrast, the other spacer sleeve 67 has a lateral backlash relative to the base 70; it therefore allows a transverse expansion of the bearing housing 65. Due to the fact that the strips 62 lie at a relatively great distance (compared to FIG. 10) from the horizontal mid-plane of the bearing housing 65, the base width B can be reduced still further; in FIG. 19, it is just a little greater than the outside diameter D of the bearing housing. If necessary, the base width B can be reduced still further to the dimension D.

I claim:

1. A bearing assembly for mounting a bearing journal of a rotatable roll, the bearing assembly comprising:
   a bearing housing, a spherical bearing element in the bearing housing for supporting the bearing journal, and the bearing journal being received in the spherical bearing element in the housing;
   means at the spherical bearing element for fixing the bearing journal in the bearing housing with respect to the direction of the longitudinal axis of the bearing assembly;
   a base; axial guide elements connecting the bearing housing to the base; the axial guide elements comprising sliding guide elements including sliding surfaces thereon, the sliding surfaces extending parallel to the longitudinal axis of the bearing assembly for enabling the bearing housing to slide axially with respect to the base due to changes in the axial length of the roll and resultant changes in the position of the bearing journal of the roll; the axial guides being structured and arranged to define a form-fit attachment between the bearing assembly and the base to allow the bearing assembly to be mounted to the base in a plurality of different orientations without affecting the attachment therebetween.

2. The bearing assembly of claim 1, wherein the sliding guide elements are in such a position that the bearing housing engages the base.

3. The bearing assembly of claim 2, wherein at least one of the sliding guide elements is shaped as to form a positive locking connection between the bearing housing and the base transversely to the longitudinal axis.

4. The bearing assembly of claim 3, wherein there are two of the sliding guide elements arranged at mutually opposite regions around the circumference of the bearing housing, each of which has a respective axis.

5. The bearing assembly of claim 4, wherein the longitudinal axis of the bearing assembly and the two respective axes of the sliding guide elements are arranged, as viewed in the axial direction, at the corners of an obtuse angled triangle, the longitudinal axis of the bearing assembly being at the obtusely angled corner of the triangle.

6. The bearing assembly of claim 5, wherein the triangle defined by the axis is an isosceles triangle.

7. The bearing assembly of claim 4, wherein the two sliding guide elements are positioned to together define a guide plane, and the guide plane lies substantially perpendicular to the direction of the force transferred by the sliding guide elements from the bearing housing to the base.

8. The bearing assembly of claim 4, wherein at least one of the two sliding guide elements is displaceable transversely to the longitudinal axis.

9. The bearing assembly of claim 1, wherein there are two of the sliding guide elements arranged at mutually opposite regions around the circumference of the bearing housing; the two sliding guide elements being positioned to together define a guide plane, and the guide plane lies substantially perpendicular to the direction of the force transferred by the sliding guide elements from the bearing housing to the base.

10. The bearing assembly of claim 1, wherein each of the sliding guide elements is in the form of a prismatic strip;
   sliding surfaces on one of the base and the bearing housing on which the prismatic strips are guided for guiding sliding of the bearing housing with respect to the base both parallel to and transversely to the longitudinal axis of the bearing assembly.

11. The bearing assembly of claim 10, wherein the strips are formed on ore of the bearing housing and the base and are received in the other of the base and the bearing housing.

12. The bearing assembly of claim 11, wherein the one of the base and the bearing housing which receives the prismatic strips has clearance for receiving the strips.

13. The bearing assembly of claim 12, wherein the one of the base and the bearing housing which receives the prismatic strips has a respective arm which is claw shaped to define a clearance which receives the respective prismatic strip therein.

14. A bearing assembly for mounting a bearing journal of a rotatable roll, the bearing assembly comprising:
a bearing housing, a spherical bearing element in the bearing housing for supporting the bearing journal, and the bearing journal being received in the spherical bearing element in the housing;
means at the spherical bearing element for fixing the bearing journal in the bearing housing with respect to the direction of the longitudinal axis of the bearing assembly;
a base; two axial guide elements connecting the bearing housing to the base; the axial guide elements comprising guide rods which engage both the bearing housing and the base and which include sliding surfaces thereon, the sliding surfaces extending parallel to the longitudinal axis of the bearing assembly for enabling the bearing housing to slide axially with respect to the base due to changes in the axial length of the roll and resultant changes in the position of the bearing journal of the roll, the guide rods being arranged at mutually opposite regions around the circumference of the bearing housing; the two guide rods being positioned to together define a guide plane, and the guide plane lying substantially perpendicular to the direction of the force transferred by the guide rods from the bearing housing to the base.

15. The bearing assembly of claim 14, wherein each of the sliding element guide rods has approximately the same cross sectional dimension.

16. A bearing assembly for mounting a bearing journal of a rotatable roll, the bearing assembly comprising:
a bearing housing, a spherical bearing element in the bearing housing for supporting the bearing journal, and the bearing journal being received in the spherical bearing element in the housing;
means at the spherical bearing element for fixing the bearing journal in the bearing housing with respect to the direction of the longitudinal axis of the bearing assembly;
a base; axial guide elements connecting the bearing housing to the base; the axial guide elements comprising two sliding guide elements including sliding surfaces thereon, the sliding surfaces extending parallel to the longitudinal axis of the bearing assembly for enabling the bearing housing to slide axially with respect to the base due to changes in the axial length of the roll and resultant changes in the position of the bearing journal of the roll, the sliding guide elements being arranged at mutually opposite regions around the circumference of the bearing housing; the two sliding guide elements being positioned to together define a guide plane, and the guide plane lying substantially perpendicular to the direction of the force transferred by the sliding guide elements from the bearing housing to the base, at least one of the two sliding guide elements being displaceable transversely to the longitudinal axis.

17. The bearing assembly of claim 16, wherein at least one sliding guide element is displaceable transversely at least approximately parallel to the guide plane.

18. The bearing assembly of claim 17, wherein at least one of the sliding guide elements is shaped as to form a positive locking connection between the bearing housing and the base transversely to the longitudinal axis.

19. The bearing assembly of claim 18, wherein the sliding guide element comprises two guiding surfaces parallel to each other and to the axis of the sliding guide element, at least one of the bearing housing and the base having a sliding surface against which the guiding surface of the sliding guide element bears.

20. The bearing assembly of claim 19, wherein the sliding guide element comprises a cylindrical guide rod, the sliding surfaces being formed by cylinder sections, which seen in cross section, lie on a common circle, the diameter of which circle is the diameter of the sliding guide element.

21. The bearing assembly of claim 16, wherein one of the bearing housing and the base includes at least one arm which is sufficiently flexible in the transverse direction as to flex with respect to the other of the bearing housing and the base upon transverse placement of the bearing housing, and the sliding guide element engaging in the at least one arm.

22. A bearing assembly for mounting a bearing journal of a rotatable roll, the bearing assembly comprising:
a bearing housing, a spherical bearing element in the bearing housing for supporting the bearing journal, and the bearing journal being received in the spherical bearing element in the housing;
means at the spherical bearing element for fixing the bearing journal in the bearing housing with respect to the direction of the longitudinal axis of the bearing assembly;
a base; axial guide elements connecting the bearing housing to the base; the axial guide elements comprising two sliding guide elements including sliding surfaces thereon, the sliding surfaces extending parallel to the longitudinal axis of the bearing assembly for enabling the bearing housing to slide axially with respect to the base due to changes in the axial length of the roll and resultant changes in the position of the bearing journal of the roll wherein there, the sliding guide elements being arranged at mutually opposite regions around the circumference of the bearing housing; the two sliding guide elements being positioned to together define a guide plane, and the guide plane lying substantially perpendicular to the direction of the force transferred by the sliding guide elements from the bearing housing to the base, the two sliding guide elements being both displaceable transversely to the longitudinal axis; and
an additional guide element being disposed between the two sliding guide elements, the additional guide element engaging in the bearing housing and in the base, the additional guide element having pairs of sliding surfaces arranged parallel to each other and substantially perpendicular to the guide plane and parallel to the longitudinal axis.

23. The bearing assembly of claim 22, wherein the pairs of sliding surfaces of the additional sliding guide element are spaced at a small distance from each other and are spaced symmetrically relative to the longitudinal axis of the bearing assembly.

24. A bearing assembly for mounting a bearing journal of a rotatable roll, the bearing assembly comprising:
a bearing housing, a spherical bearing element in the bearing housing for supporting the bearing journal, and the bearing journal being received in the spherical bearing element in the housing;

means at the spherical bearing element for fixing the bearing journal in the bearing housing with respect to the direction of the longitudinal axis of the bearing assembly;

a base; axial guide elements connecting the bearing housing to the base; the axial guide elements comprising sliding guide elements including sliding surfaces thereon, the sliding surfaces extending parallel to the longitudinal axis of the bearing assembly for enabling the bearing housing to slide axially with respect to the base due to changes in the axial length of the roll and resultant changes in the position of the bearing journal of the roll, each of the sliding guide elements being in the form of a prismatic strip;

sliding surfaces on one of the base and the bearing housing on which the prismatic strips are guided for guiding sliding of the bearing housing with respect to the base both parallel to and transversely to the longitudinal axis of the bearing assembly, the strips being formed on one of the bearing housing and the base and being received in the other of the base and the bearing housing, the one of the base and the bearing housing which receives the prismatic strips has a first guiding surface and a second guiding surface for guiding the respective prismatic strip, the second guiding surface being positioned at a distance from the first guiding surface;

an auxiliary strip on the one of the bearing housing and the base that receives the prismatic strip, and the auxiliary strip having the second guiding surface defined thereon;

at least one spacer piece and connecting elements for together holding the auxiliary strip at the location such that the second guiding surface is at the distance from the first guiding surface.

25. The bearing assembly of claim 24, wherein the spacer piece and the connecting elements extend transversely through the prismatic strip.

* * * * *